(12) United States Patent
Mendoza et al.

(10) Patent No.: US 6,279,768 B1
(45) Date of Patent: Aug. 28, 2001

(54) INDOOR/OUTDOOR ELECTRICAL ENCLOSURE

(75) Inventors: Anthony C. Mendoza; Henryk Dabrowski, both of Alberta (CA)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/584,422

(22) Filed: Jun. 5, 2000

(51) Int. Cl.$^7$ ................................................. B65D 43/00
(52) U.S. Cl. ........................ 220/3.92; 220/3.8; 220/3.94
(58) Field of Search .................. 220/3.92, 3.94, 220/3.8, 3.7

(56) References Cited

U.S. PATENT DOCUMENTS

| | | | | |
|---|---|---|---|---|
| 2,250,977 | * | 7/1941 | Walker | 220/3.8 |
| 2,265,926 | * | 12/1941 | Pike | 220/3.94 |
| 2,297,862 | * | 10/1942 | Bachmann | 220/3.94 X |
| 2,330,975 | * | 10/1943 | Jackson | 220/3.8 |
| 2,656,948 | * | 10/1953 | McGee | 220/3.8 X |
| 2,680,533 | * | 6/1954 | Cole | 220/3.8 X |
| 3,955,709 | * | 5/1976 | Coley et al. | 220/3.8 X |

\* cited by examiner

*Primary Examiner*—Steven M. Pollard
(74) *Attorney, Agent, or Firm*—Martin J. Moran

(57) ABSTRACT

An outdoor enclosure for an electrical device includes a channel-shaped base plate, a five sided cover, and a flush-mount plate. The flush-mount plate has an opening that makes the front wall of the cover visible. The flush-mount plate allows the enclosure to be mounted flush indoors through a commercial building or a residential dwelling gypsum wall. The flush-mount plate has holes that are aligned with the threaded cylinders of the cover through which machine screws may pass to secure the cover to the flush-mount plate. The cover has no front flanges, and the bottom wall of the cover has slots, which allow the base plate to slide into the cover. The cover side flanges have holes and slots for side mounting. Additional side flanges that are bent from the top wall cover the upper parts of the side flanges of the cover, and prevent water from entering the enclosure from the top. A rear flange that is bent from the top wall prevents water from entering the top of the base plate. The cover top wall has a welded mounting plate for surface mounting. The channel-shaped base plate has holes at the bottom of its side flanges which are aligned with the holes of the cover side flanges. Machine screws pass through these holes and provide a way for securing the base plate and cover together. At the bottom of the base plate are slots for surface mounting.

24 Claims, 9 Drawing Sheets

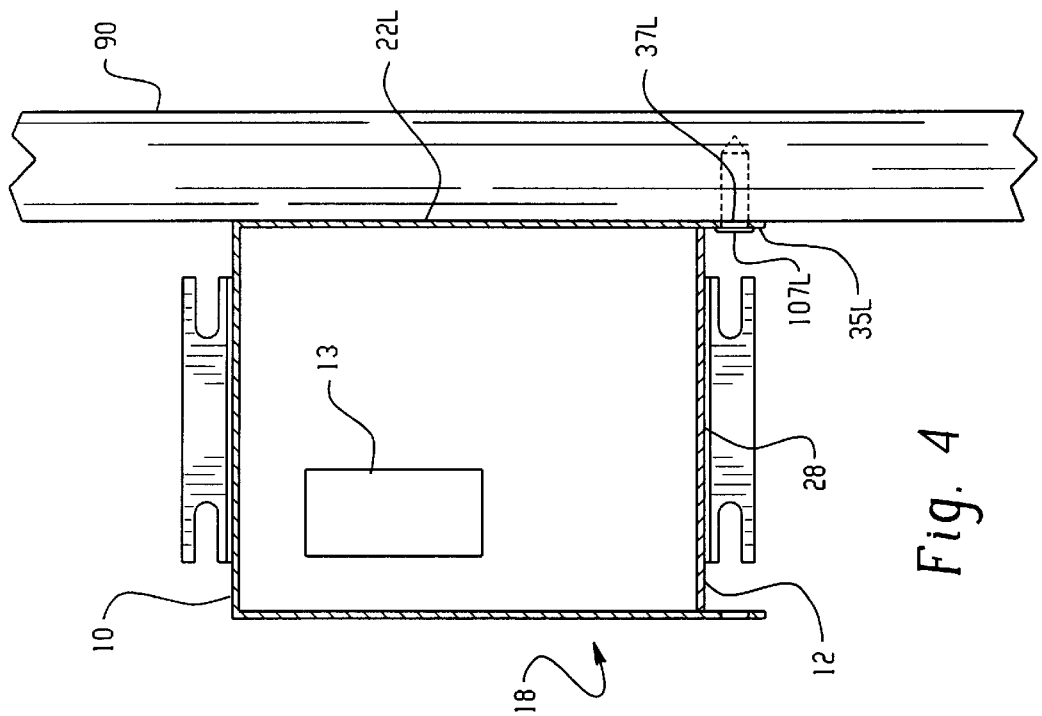
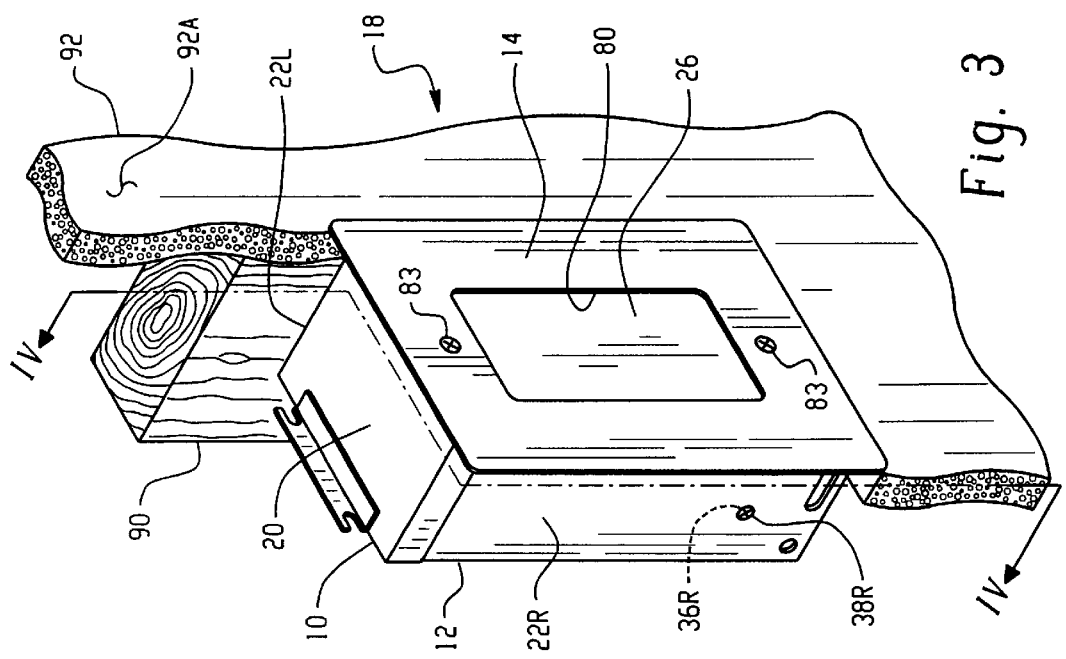

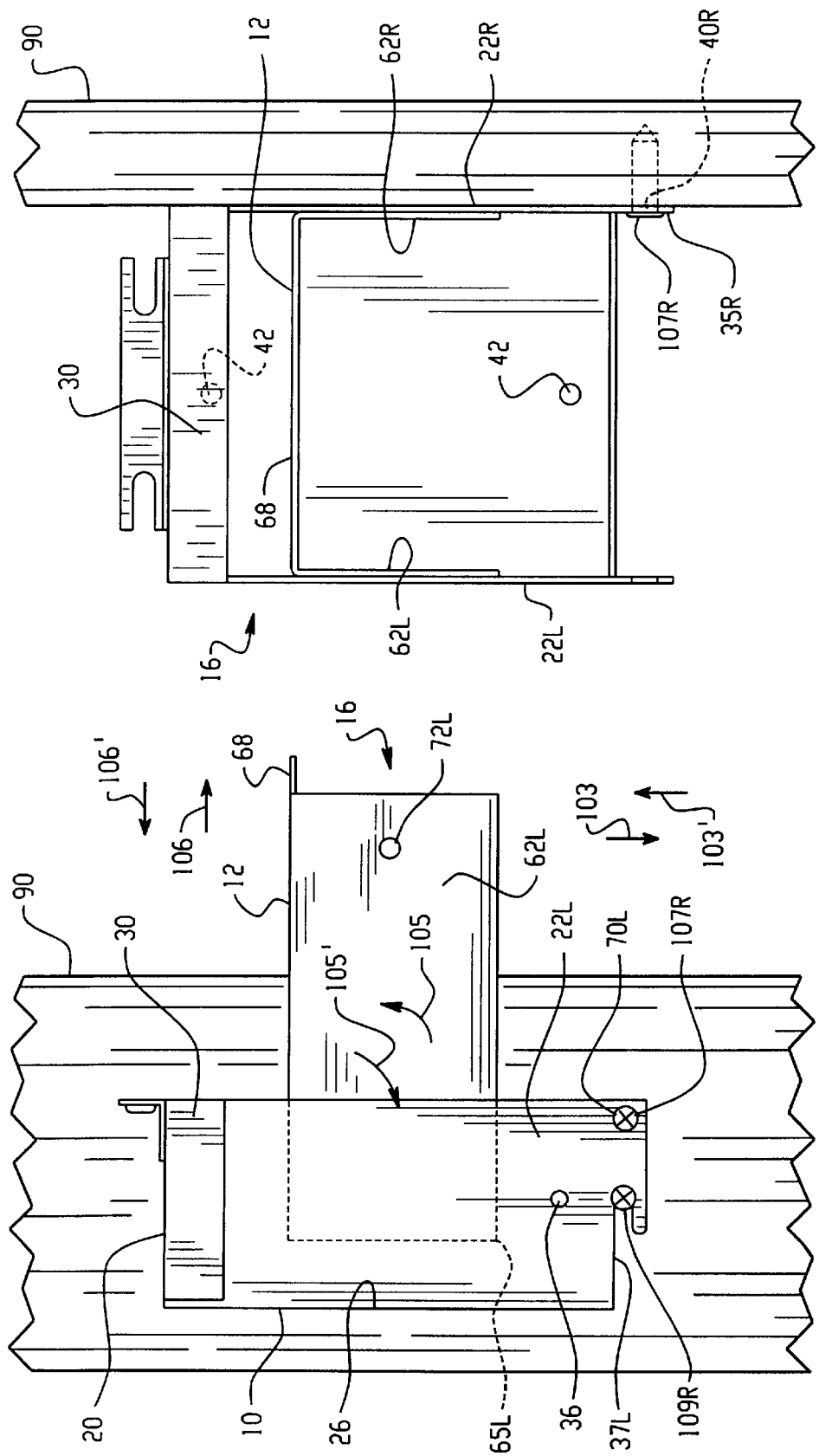

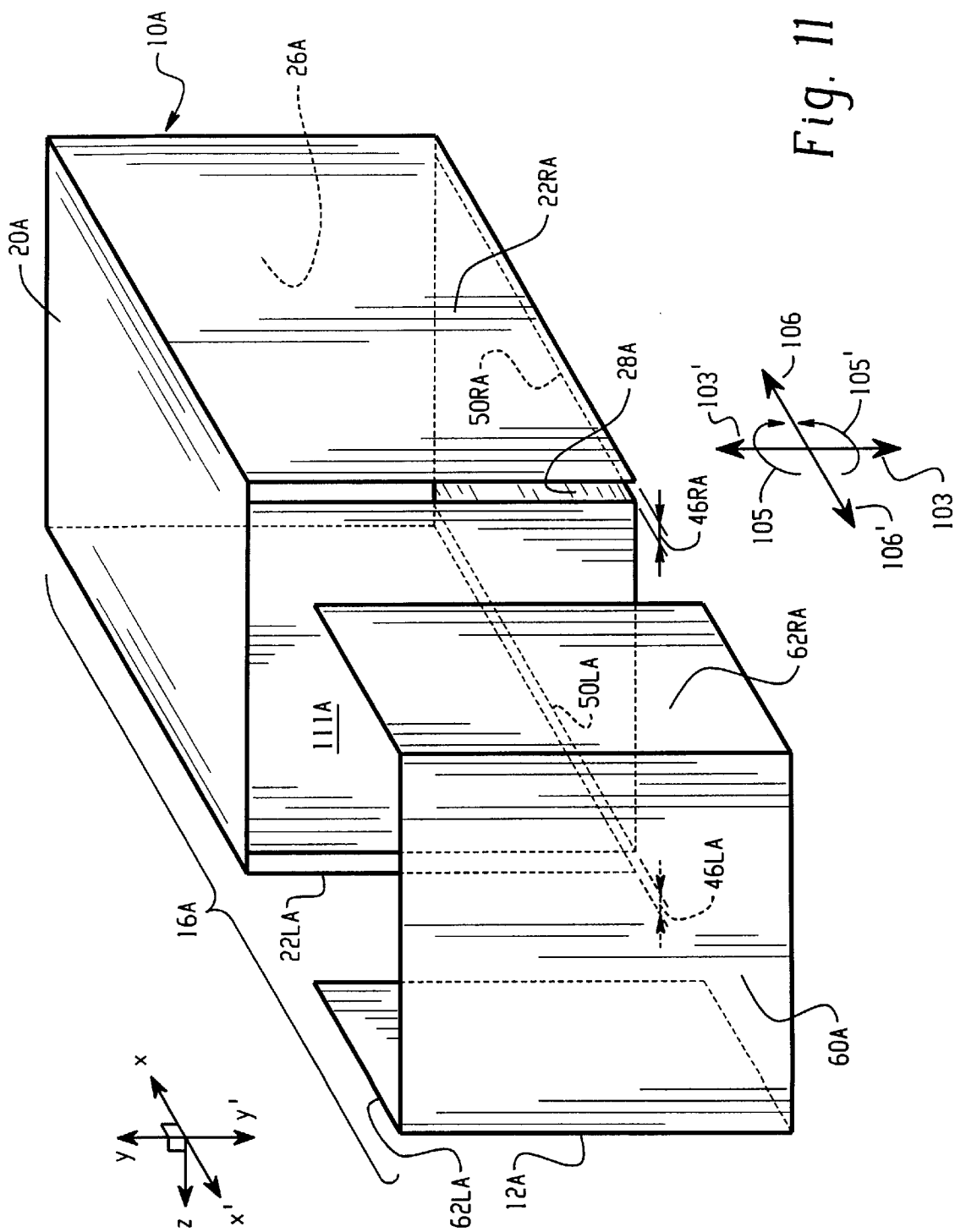

US 6,279,768 B1

INDOOR/OUTDOOR ELECTRICAL ENCLOSURE

BACKGROUND OF THE INVENTION

1. Field of the Invention

This invention relates to an indoor/outdoor enclosure for electrical apparatus and more particularly pertains to a rain-tight enclosure.

2. Description of the Prior Art

Indoor/outdoor enclosures for electrical accessories are known. Various problems have been associated with them including rain-tightness and accessibility to the interior thereof. In addition, rain-light outdoor electrical enclosures usually lack provision for indoor flush-mount application. A flush-mount enclosure can be mounted on a commercial or residential dwelling gypsum wall with a flush-mount plate. The only viewable component is the flush-mount plate and a wall of the enclosure. With present rain-tight outdoor enclosures, made from bent sheet steel, the front of the enclosure has a bend in it. Consequently, if it is use indoors with a flush-mount plate, the flush-mount plate will not seat properly. An example of a prior art outdoor electrical enclosure can be found in U.S. Pat. No. 3,955,709 issued May 11, 1976, to Coley et. al. and assigned to the Westinghouse Electric Corporation of Pittsburgh, Pa., which is the predecessor in title of Eaton Corporation which is now the owner of that patent.

It would be advantageous if one enclosure could be found which functions for both indoor and outdoor applications.

SUMMARY OF THE INVENTION

It has been found in accordance with this invention that an improved indoor/outdoor enclosure may be provided. The present invention comprises:

An enclosure for electrical apparatus which includes a first enclosure for at least partially enclosing electrical apparatus. A second enclosure is provided which cooperates with the first enclosure for at least partially enclosing the electrical apparatus. The first enclosure has spaced, generally parallel, first plates with the enclosed region disposed therebetween. It also has an attached, angularly perpendicular, offset plate disposed between the parallel plates. There is an open region existing between one of the parallel plates and the offset plate. The second enclosure has a first plate generally perpendicularly offset from the first enclosure parallel plates and the offset plate. The second enclosure first plate has an attached second plate which is generally perpendicular to the first plate and which is generally parallel with said first enclosure parallel plates. It is disposed in the open region. The second enclosure parallel plate can be translated through the open region. Alternatively, the second enclosure parallel plate can be rotated through the open region. In addition, the second enclosure parallel plate can be translated and rotated simultaneously through the open region. This is beneficial in the assembly and disassembly process. The aforementioned opening may be an elongated slot. The first enclosure may be a box with five sides. The second enclosure may be U-shaped with the web portion thereof the second enclosure first slots amounting to a sixth side of the finished enclosure.

BRIEF DESCRIPTION OF THE DRAWINGS

For a better understanding of the invention reference may be had to the preferred embodiment thereof shown in the accompanying drawings in which;

FIG. 3 is an isometric view, partially broken away of an assembled box when used in an indoor environment;

FIG. 4 is a front elevation, partially broken away of the embodiment of FIG. 3;

FIG. 9 is a side elevation of an embodiment of the apparatus of the invention in a rotational disassembly mode;

FIG. 10 is a view of the apparatus of FIG. 9 in front elevation;

FIG. 11 is orthogonal view similar to that shown in FIG. 1, but shown in mechanical schematic form;

DESCRIPTION OF THE PREFERRED EMBODIMENT

Figure 1:
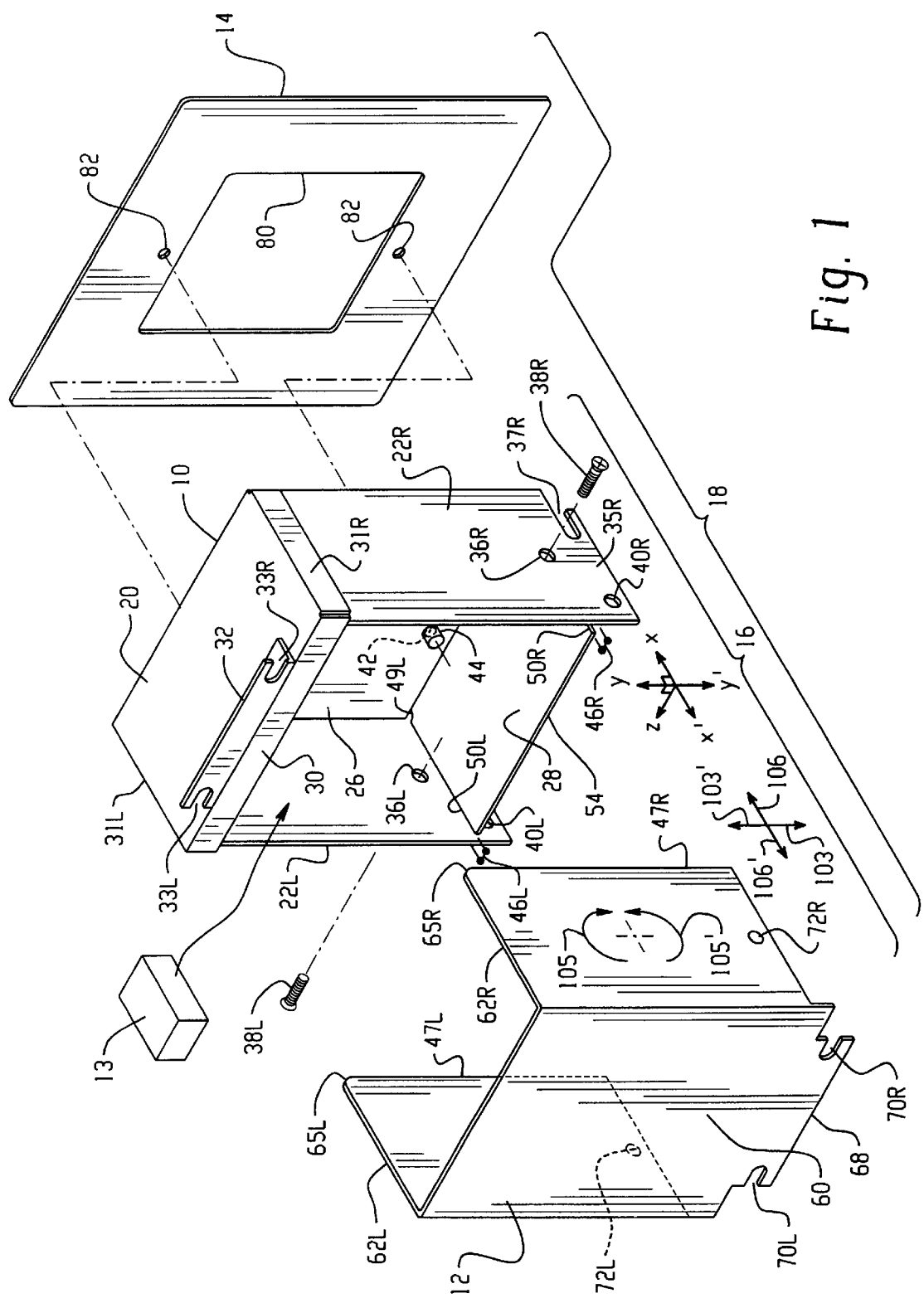
FIG. 1 is an exploded, isometric view of the three main components of the present invention.

Referring now to the drawings and FIG. 1 in particular, construction features of the present invention are depicted. In particular there is depicted a central cover 10. Disposed on the left thereof and exploded away therefrom is a base plate 12. Shown on the right thereof and exploded away therefrom is a flush-mount plate 14. The cover 10 and base plate or base 12 may be utilized to construct a cover-base plate assembly enclosure 16 for electrical apparatus or alternately may be utilized to form an assembled cover, base plate and flush-mounted plate enclosure 18 for electrical assembly apparatus. Assembly enclosure 16 may be utilized for outdoor operation and assembly enclosure 18 may be utilized for indoor operation. A representative electrical apparatus 13 is shown with a depiction of its location within the central or protected portion of the apparatus 16 or 18 as the case may be. The covered 10 may include a cover top wall 20, a perpendicular cover right side wall 22R and a perpendicular cover left side wall 22L. Walls 22R and 22L are preferably parallel to each other. There also may be a cover front wall 26, which is perpendicular to both the cover top wall 20 and the parallel sidewalls 22L and 22R. Lastly, there may be a cover bottom wall 28 which may be perpendicularly, oriented with respect to parallel side walls 22L and 22R and cover front wall 26 and which may be parallel with cover top wall 20. The top wall 20 may include a perpendicularly downwardly disposed cover upper rear flange 30 and perpendicular, cover upper right and left side flanges 31R and 31L respectively. The aforementioned flanges 30, 31L and 31R, which protrude downwardly from cover 20, provide a rain-shielding awning for the completed assembly 16 or 18. Mounted on top of the cover top wall 20 is a cover upper mounting plate 32 having spaced apart cover upper mounting plate right and left screw slots 33R and 33L respectively. Projecting downwardly from each of the sidewalls 22R and 22L are cover lower right mounting plate and lower left mounting plate 35R and 35L respectively. There is provided in each of the side walls 22R and 22L, cover right side self-tapping screw hole and left side self-tapping screw hole 36R and 36L respectively. Each of the lower left and lower right mounting plates 35R and 35L have a forwardly opening cover lower right mounting plate and lower left mounting plate screw slot 37R and 37L respectively. For completing the construction process there is provided for each of the self-tapping screw holes 36R and 36L, cover right and left side self-tapping screws 38R and 38L respectively, the use of which will be described more fully hereinafter. Also disposed on each of the right and left side walls 22R and 22L in the region of the cover lower right and left mounting plates 35R and 35L, respectively, are cover lower right and left mounting plate screw holes 40R and 40L respectively. There is provided in the front wall 26 a pair of vertically aligned cover front wall mounting holes for flush-plate 14. For assisting in the mounting process there is provided for each of the holes 42 a cover front wall flush-plate threaded cylinder 44 for the screws which will attach the flush-mount plate 14 to the cover 20. The cover bottom wall 28 may be purposely made shorter in width than the distance between the parallel side plates 22L and 22R to thus form gaps or opened regions. In particular, there may be right and left cover bottom wall to side wall gaps or open regions 46R and 46L, respectively which may extend to the front wall 26. In each case there may also be provided near the interface of the cover bottom wall 28 and cover front wall 26 in the regions of the aforementioned elongated slots 46R and 46L, right and left cover bottom wall to side wall gap front radiuses 49R and 49L respectively. Cover bottom wall 28 has a cover bottom wall right edge 50R and a cover bottom wall left edge 50L. It is these edges 50R and 50L, which are spaced from the side walls 22R and 22L respectively to form the elongated gaps or openings 46R and 46L respectively. There is also provided a cover bottom wall rear edge 54 on the cover bottom wall 28.

Base plate 12 may include a base plate rear wall 60 which is generally parallel to the cover front wall 26 in the assembled enclosure 16 or 18. There is provided a base plate right side wall and a base plate left side wall 62R and 62L respectively, which protrude from rear to front in the orientation of FIGS. 1 and 2 from the aforementioned base plate rear wall 60 towards cover 10. These base plate side walls 62R and 62L are parallel with the cover right side wall 22R and left side wall 22L and are meant to move through the openings 46R and 46L respectively during the assembly and disassembly process or operation for the completed enclosure 16 or 18 as the case may be. The upper corner of each of the base plate right and left sidewalls 62R and 62L have disposed thereon left and right wall base plate front corner radii 65R and 65L respectively. The latter mentioned radii are advantageous for angularly rotating base 12 outwardly or inwardly along pivots established by the radii against the back wall 26 of the cover 20 during the assembly or disassembly process. The sidewalls 62R and 62L may be moved through the gaps or openings 46R and 46L transitionally, rotationally or in both modes of movement during the assembly and disassembly process. There is provided at the bottom of the base plate rear wall 60 a base plate rear mounting plate 68 having disposed or spaced apart on either side thereof base plate right and left mounting plate screw slots 70R and 70L, respectively, which face outwardly towards the walls 62R and 62L respectively. There is also provided in the bottom most portion of each of the right and left base plate side walls 62R and 62L base plate right and left side wall holes 72R and 72L respectively the use of which will be described more fully hereinafter.

Referring now to the flush-mount plate 14, there is provided a flush-mounting plate central opening 80 and two vertically spaced flush-mounting plate flush-mounting holes 82 which generally align with the previously described cover front wall mounting holes 42 for the flush-mount plate 14. The opening 80 is useful in an embodiment where the assembled cover, base plate and flush-mounted plate or enclosure for electrical apparatus 18 is utilized in an indoor mode for allowing information which is disposed on the front of the cover front wall 26 to be viewed by a reader.

Figure 2:
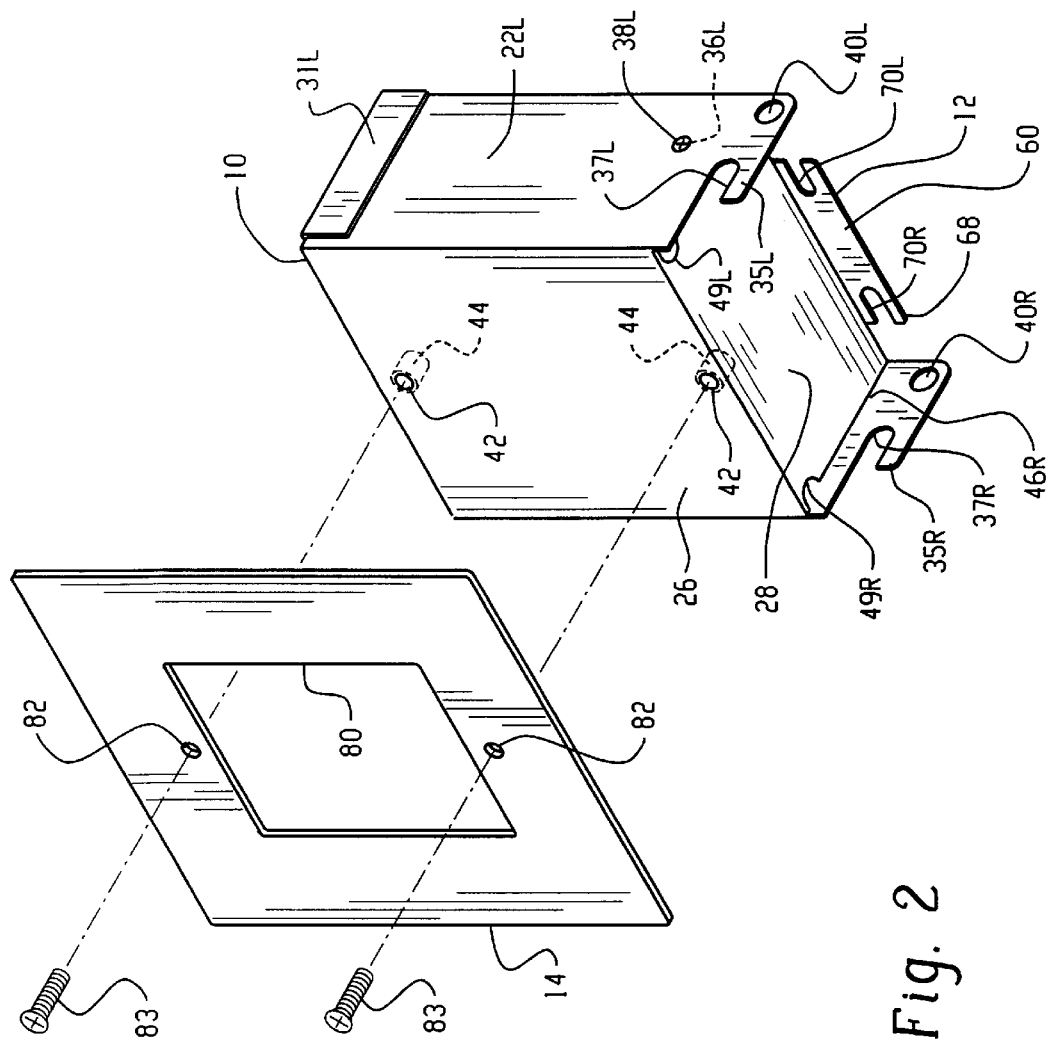
FIG. 2 is an exploded, isometric view of the components of FIG. 1 shown in the reverse direction and partially assembled.

As best seen in FIG. 2, when the base plate 12 has been joined with the cover 10, base plate right and left side walls 62R and 62L fit in or above the slots 46R and 46L so that back edges 47R and 47L respectively of the plate 62R and 62L abut against the rear part of the cover front wall 26 and so that the holes 72R-36R and 72L-36L, respectively, align. In that way the cover right side and left side self-tapping screws 38R and 38L may be inserted to affix the base plate 12 to the cover 20. Generally, in the assembly process, the base plate 12 is inserted into the cover 20 in such a manner that the right and left side walls 62R and 62L translate through the open slots 46R and 46L until the rear edges 47L and 47R strike against the back part of the cover front wall 26. Then the base plate 12 is slid upwardly inside of the cover upper rear flange 30 until the aforementioned holes 72R-36R, 72L-36L align. Then the aforementioned self-tapping screws 38R and 38L are screwed in. Consequently, it can be seen that one of the advantages of the present invention lies in the fact that the side walls 62L and 62R may not only translate rear-to-front and front-to-rear in the assembly-disassembly process but also may slide up-and-down and down-and-up and may also rotate through the openings 46R and 46L to provide a wide range of assembly and disassembly options. It will be noted that as flush-mount plate 14 is abutted against the front of front wall 26 and the screws 83 are inserted through the holes 82 into the flush plate threaded cylinders 44 in the holes or openings 42, there is no protrusion on the inside of plate 14 or outside of wall 26 to prevent flush mounting.

It can be seen that the base plate 12 is primarily channel shaped and the cover 10 comprises a five sided box. The flush-mount plate 14 allows the enclosure to be mounted flush indoors through a commercial building or residential dwelling gypsum wall. The enclosure has provisions for mounting on its surfaces and sides with or without the use of the flush-mount plates. Rear surface mounting may be accomplished by way of the base plate front mounting plate 68 and the upper cover mounting plate 32. Side mounting may be accomplished by use of the cover lower left and right mounting plate screw slots 37R and 37L or the cover lower right and left mounting plate screw holes 40R and 40L respectively. There are no front flanges on the cover and the bottom wall 28 of the cover 10 has slots 46R and 46L which allow the base plate sides 62R and 62L, respectively, to slide into the cover 10. The holes 49L and 49R are conveniently located for water drainage from the inside of the completed assembly 16. The rear and side flanges 30, 31R and 31L respectively are bent downwardly from the top wall 20 to prevent water from entering the enclosure from the top. The mounting plate 32 may be welded to the top of the cover of top wall 20. The rear flange 30 also prevents the top of base plate 12 from rotating or pivoting outwardly or towards the rear on the screws 38R and 38L. The edges 47R and 47L of the walls 62R and 62L abutting against the rear portion or inside of the cover front wall 26 prevent rotation or pivoting in the opposite direction. When disassembling or removing the base plate 12 from the cover 10, the base plate 12 may be lifted at the base plate rear mounting plate 68 so that the entire base plate rotates on the corner radii 65R and 65L against the back portion of the cover front wall 26 so that no hinges are required for the assembled product. The locations of the holes 40R and 40L on the right and left, respectively, and the slots 37R and 37L on the right and left, respectively, are such that the enclosure 16 or 18 can be mounted on either of its sides without gaining internal access to the region of the electrical apparatus 13.

Referring now to FIGS. 3 and 4, installed views of an assembled cover, base plate and flush-mounted plate embodiment 18 are depicted. In particular, there is shown a construction stud 90 which may comprise wood or metal as used or required by the local building ordinance. There is provided an internal wall 92 which may comprise gypsum. Wall 92 may be oriented perpendicularly to stud 90 and may comprise the internal wall of a dwelling. In order for the assembled covered base plate and flush mounted plate 18 to be utilized in this environment, cover 10 with its fully attached base plate 12 is abutted on its side 22L against a flat surface of the stud 90. The box 10 is fixably maintained against the stud 90 by way of a cover lower left front mounting plate screw 107L projecting through mounting plate screw slot 37L into the wall 90 thus securely affixing the cover lower left mounting plate 35L in place. A similar screw is threaded through hole 40R (not shown) in the lower left mounting plate 35L to complete the attachment of the box 10 to the stud 90. In the embodiment of FIGS. 3 and 4, base plate 12 has been inserted into cover 10 in a manner described previously and is fixably held there by way of screw 38R feeding through hole 36R in side plate 22R. In a like manner, a similar screw is fed through a similar hole on the side 22L to complete the securement of the base plate 12 to the cover 10. The front portion of the rear wall 26 is fed through a hole or opening (not shown in the wall 92) so that the front portion of the front wall 26 is generally flush with the flat internal surface 92A of the wall 92. Flush-mount plate 14 is then attached to the cover 10 by way of screws 83 in the manner described previously.

The central opening 80 in the flush-plate 14 provides access to the front portion of the front wall 26 so that any instructions or words depicted thereupon may be viewed by a person internal to the structure in which the gypsum wall 92 is disposed.

Figure 6:
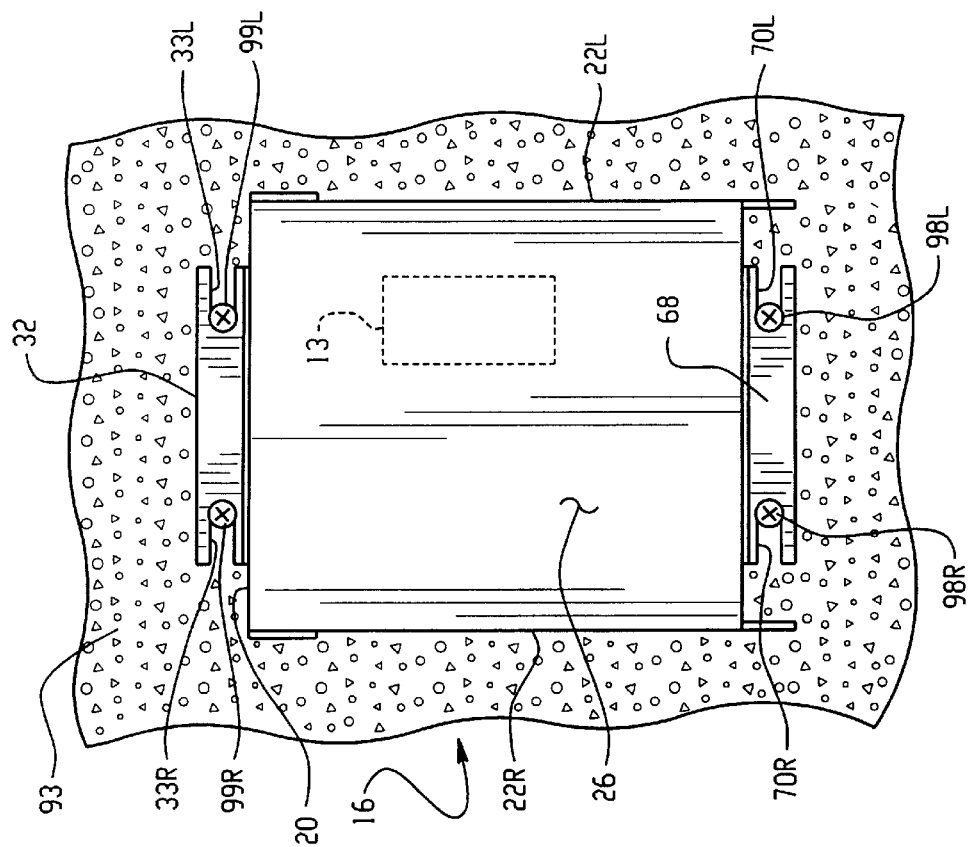
FIG. 6 is a view of the embodiment of FIG. 5 in front elevation.
Figure 5:
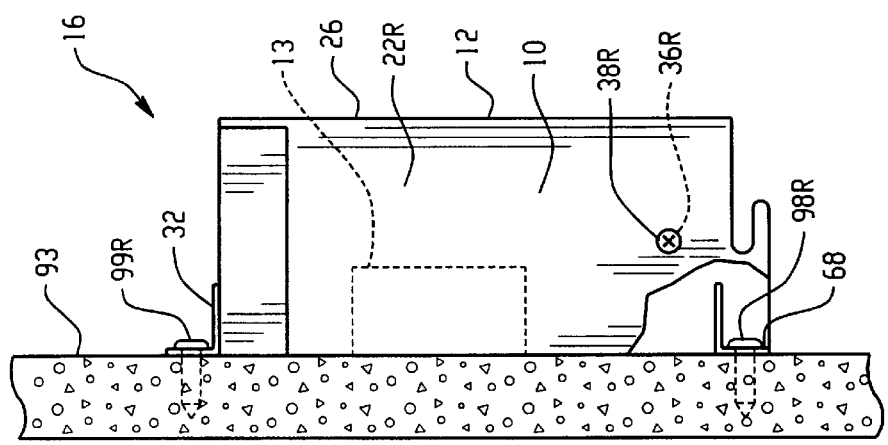
FIG. 5 is a side elevation, partially broken away of an assembled box when used in an outdoor environment.

Referring now to FIGS. 5 and 6, another embodiment of the invention is shown in which the cover base plate assembly for indoor or outdoor use 16 is depicted in an outdoor environment. In particular there is provided a dwelling wall 93, which may comprise concrete, brick or the like. Assembled box 16 comprising cover 10 and affixed base plate 12 is flushly mounted against the wall 93 by way of the base plate rear mounting plate, right mounting screw 98R and cover upper mounting plate, right mounting screw 99R fed through the screw slots 70R and 33R, respectively, of cover upper mounting plate 32 and base plate rear mounting plate 68, respectively. FIG. 6 clarifies that two sets of mounting screws are provided. In particular, base plate rear mounting plate right and left mounting screws 98R and 98L, respectively, are disposed in slots 70R and 70L, respectively, of base plate rear mounting plate 68. Cover upper mounting plate right and left mounting screws 99R and 99L, respectively, are disposed in slots or grooves 33R and 33L, respectively, in the cover upper mounting plate 32. Base plate 12 is shown affixedly attached to the top cover 10 by way of the screw 38R feeding through hole 36R as shown in FIG. 5. It is to be understood, although not shown in FIG. 5 and 6, that a similar screw 38L may feed through hole 36L in the left side 22L of the cover 10.

Figure 7:
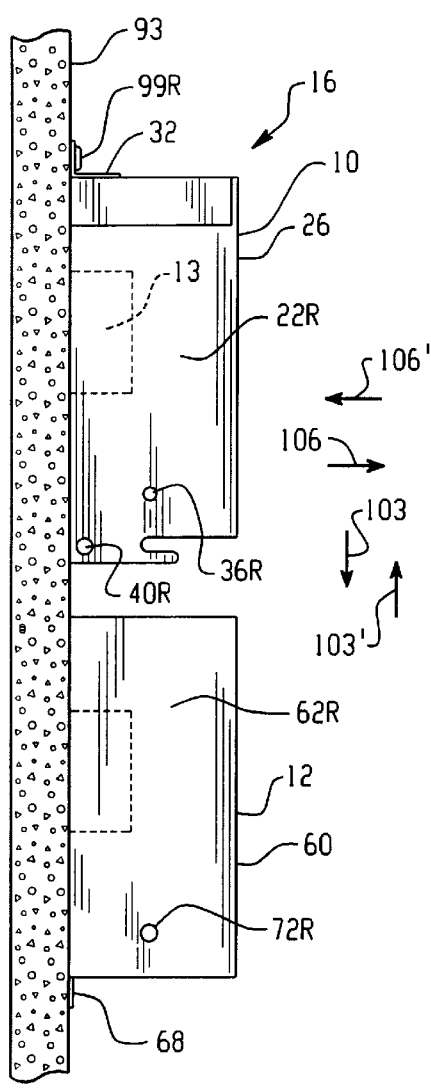
FIG. 7 is a view of the embodiment of FIG. 5 shown in a disassembled disposition.
Figure 8:
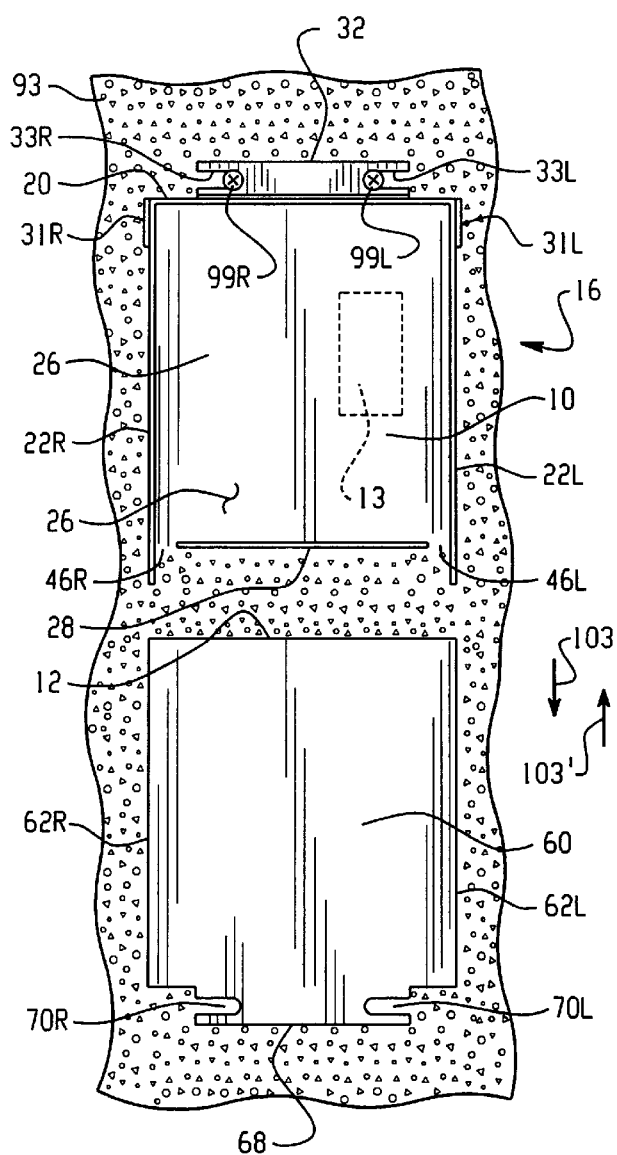
FIG. 8 is a front elevation view similar to that shown in FIG. 6 and FIG. 7.
Figure 12:
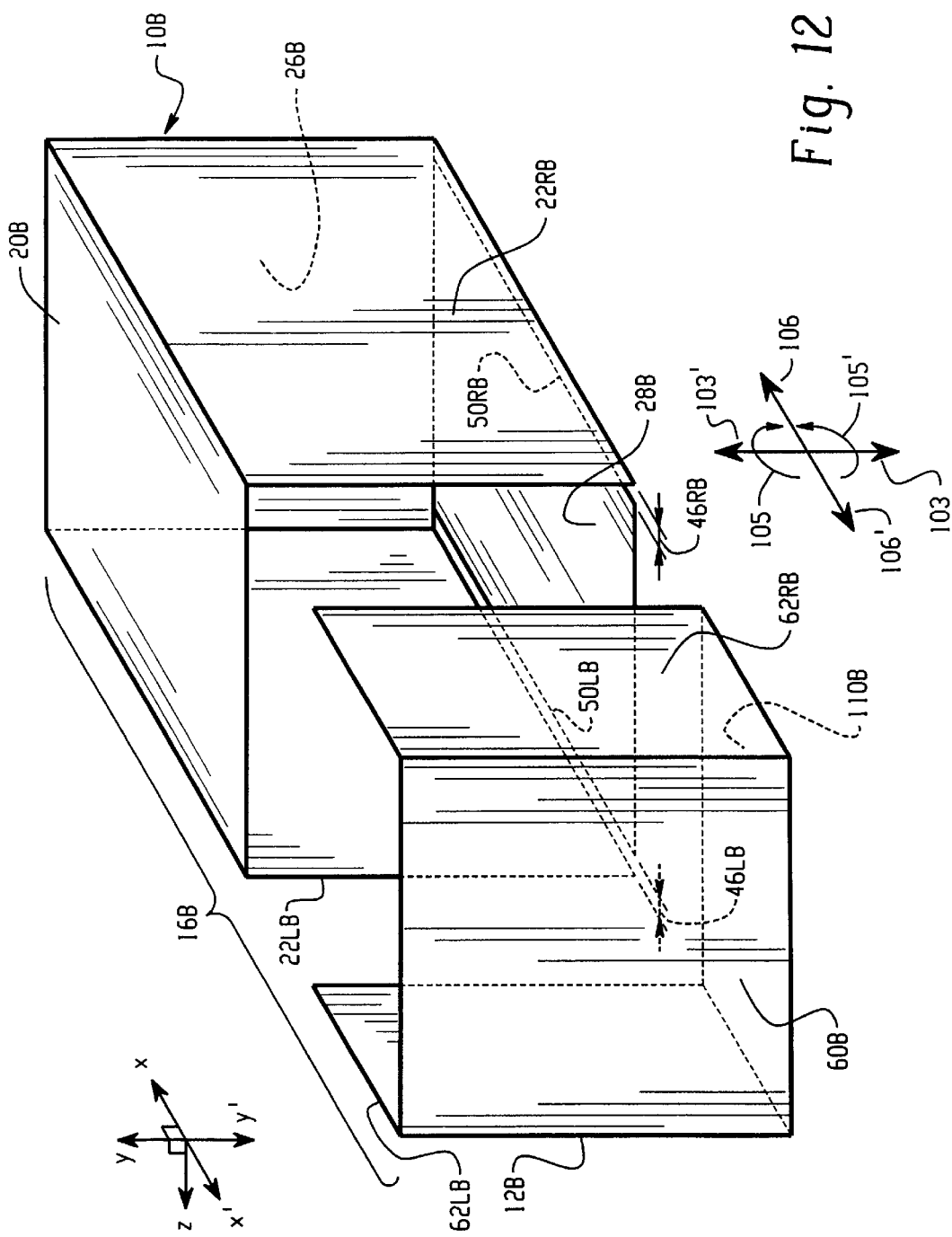
FIG. 12 is a view similar to that of FIG. 11 for another embodiment of the invention.
Figure 13:
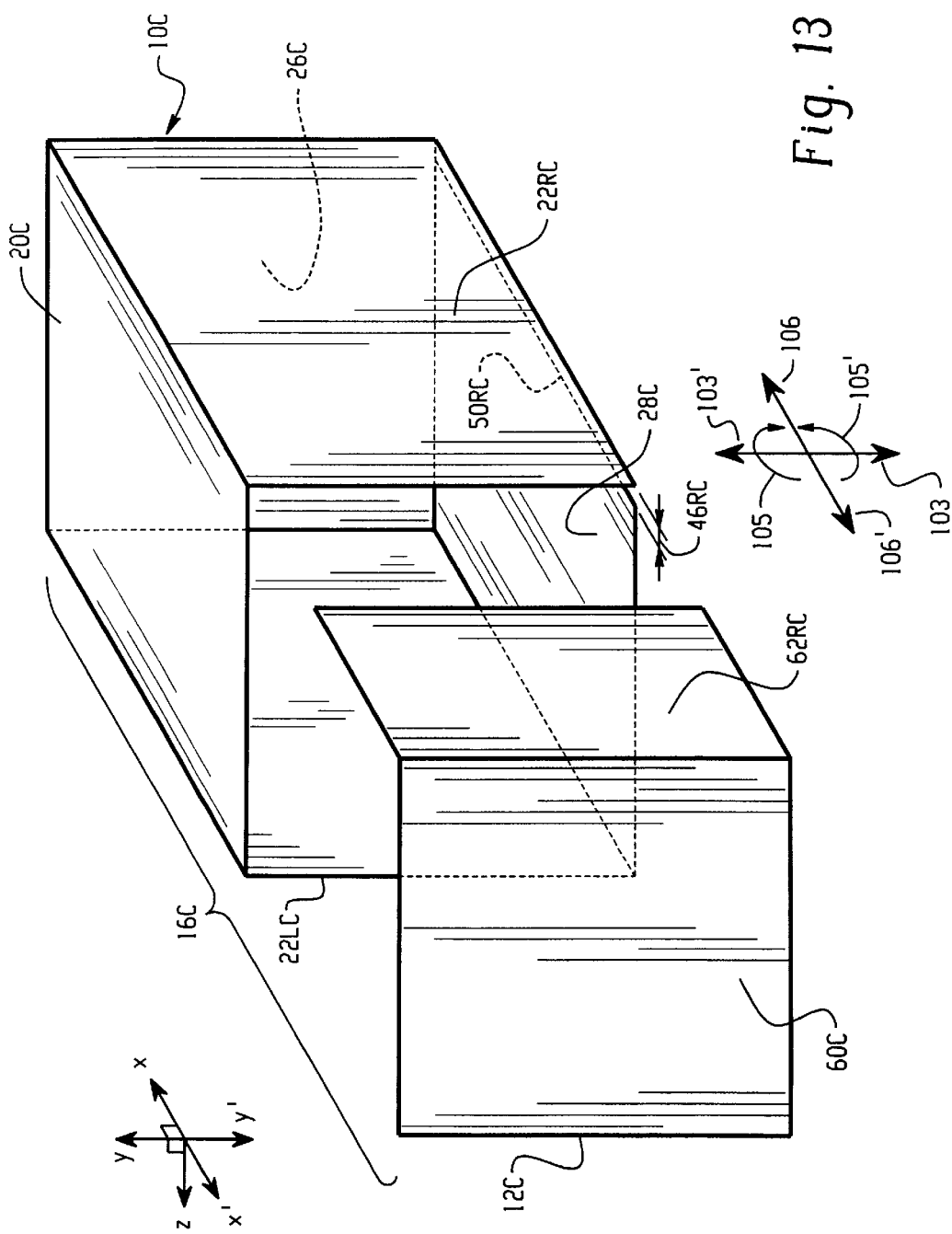
FIG. 13 is a view similar to that shown in FIGS. 11 and 12 for still another embodiment of the invention.

Referring now to FIGS. 7 and 8, the embodiment of FIGS. 5 and 6 is depicted in the disassembled mode. This mode clarifies that it is possible to disassemble the base plate 12 from the cover 10 for access to electrical apparatus 13 which may be disposed inside of the enclosure 16. In this case, the screws 38R and 38L have been removed from the cover self-tapping screw holes 36R and 36L, respectively. Also the screws 98R and 98L, best shown in FIGS. 5 and 6, have also been removed from the base plate rear mounting plate 68. Such being the case, base plate 12 may be slid in the direction 103, outwardly from the interior of the cover 10. This is advantageous for servicing the electrical apparatus 13 which is disposed within the enclosure 16. The cover top wall 20 and the bottom wall 28 are clearly shown. It will be noted, with respect to this embodiment, that the front wall 26 of the cover 20 prevents movement of the base plate 12 outwardly in the direction 106. Consequently, disassembly can only take place from the bottom most portion of the cover 10. The right and left cover bottom wall to side wall gaps or open regions 46R and 46L, respectively, are also depicted. Also depicted are the upper right and upper left cover flanges 31R and 31L respectively.

Referring now the FIGS. 9 and 10 as well as FIGS. 1 and 2, an embodiment in the invention is depicted. In particular there is shown a stud 90 having flushly disposed there against and affixed thereto the cover base plate assembly 16. In particular, the cover 10 is shown oriented relative to the base plate 12 so that rotation of the base plate 12 in the rotational direction 105, out of securement with the cover 10 is depicted. As was the case previously, the screw 38 is removed from the base plate left side hole 72 and the cover left side self-tapping screw hole 36L. The base plate left and right side wall upper front radius corners 65L and 65R have rotated against the front wall 26 to place the base plate 12 in the disposition shown in FIGS. 9 and 10. In this embodiment of the invention, base plate 12 may be moved outwardly in the direction 106. However, it would not be removable in the direction 103 because of the placement of the screw 109R in the slot 37R and the screw 107R in the hole 40R. The latter two screw arrangements are the primary way of affixing the cover base plate assembly 16 to the stud 90. The base plate 12 may be rotated in the direction 105 so that the top most portion of the rear base plate wall 60 is dropped or disposed beneath the bottom most portion of the upper right flange cover 30. Of particular note, in respect to FIG. 9, is that the cover lower right rear mounting plate screw 109 is shown through the cover lower left mounting plate screw slot 37L even though it affixes the cover 10 to the wall 90 by way of cover lower right mounted plate screw slot 37R as is more clearly depicted in FIG. 1.

Referring now to FIGS. 11 through 13 and FIG. 1, alternative embodiments of the cover and base plate arrangement are depicted. In these embodiments of the invention similar reference symbols are use for similar parts, except that identifiers A, B and C are provided for each of the embodiments of FIGS. 11, 12 and 13 respectively. This helps highlight the differences between the embodiments of each of these figures and FIG. 1. In addition, the orthogonal arrangement of relative directions are depicted. In particular direction X is a rear-to-front direction, direction Y is a bottom-to-top direction, direction Z is a right-to-left direction and direction Y' is a top-to-bottom direction. Thus it can easily be seen that the movement of a base plate member 12 into a cover member 10 may be in the direction X. Alternatively it may be in the direction Y. Finally, removal of that member may be in the direction Y' or X'. Consequently, with respect to all embodiments there is provided a cover 10,10A, 10B or 10C; a cover top wall 20, 20A, 20B or 20C; a base plate 12, 12A, 12B or 12C; a base plate rear wall 60, 60A, 60B or 60C; a base plate right side wall 62R, 62RA, 62RB or 62RC; and a base place left side wall 62L, 62LA, 62LB or 62LC. Cover 10 may have a cover right side wall 22R, 22RA, 22RB or 22RC; and a cover left wall 22L, 22LA, 22LB or 22LC. There is also provided a cover bottom wall 28, 28A, 28B or 28C. In the embodiment shown in FIG. 12, there is also provided a base plate bottom wall 11 OB. There are provided cover bottom wall right edges 50R, 50RA, 5ORB or 5ORC; and cover bottom wall left edges 50L, 50LA or 50LB. There is no identifiable left edge for the embodiment of FIG. 13. There is also provided right cover bottom wall side wall gap or elongated open region 46R, 46RA, 46RB or 46RC. There is also provided a left cover bottom wall to side wall gap or elongated open region 46L, 46LA or 46LB. There is no similar gap for the embodiment of FIG. 13. In the embodiment of FIG. 11 there is provided a cover rear wall 111 which is generally parallel to and opposite from the cover front wall 26. Thus it can be seen in the embodiment of FIG. 11 that base 12A may be moved into cover 10A in the direction 103' and may be removed therefrom in the directions 106' and 103', respectively. The same applies for the embodiments of FIGS. 12 and 13. Also it can be seen that the base plate 12, 12A, 12B or 12C as the case, may be maybe rotated out of the cover 10, 10A, 10B or 10C, respectively, by rotating in the direction 105. Insertion may occur in a direction 105'.

What is claimed is:

1. An enclosure for electrical apparatus, comprising:
   first enclosure means for partially enclosing electrical apparatus;
   second enclosure means cooperative with said first enclosure means for completing the enclosure of said electrical apparatus;
   said first enclosure means including spaced generally parallel top and bottom plates having an enclosure region disposed therebetween and a generally angularly perpendicularly offset first enclosure means side plate, an elongated slot between said bottom plate and said side plate; and
   said second enclosure means having a rear plate generally perpendicularly offset from said top and bottom parallel plates and said first enclosure means side plate, said rear plate having an attached perpendicular second enclosure means side plate which is parallel with said first enclosure means side plate and disposed in proximity to said first enclosure means side plate in said elongated slot and which is movable through said elongated slot.

2. The enclosure as claimed in claim 1, wherein said attached perpendicular second enclosure means side plate is movable through said elongated slot in translation.

3. The enclosure as claimed in claim 1, wherein said attached perpendicular second enclosure means side plate is movable through said elongated slot in rotation.

4. The enclosure as claimed in claim 1, wherein said attached perpendicular second enclosure means side plate is movable through said elongated slot in translation and rotation.

5. An enclosure for electrical apparatus, comprising:
   a first enclosure member including a pair of spaced generally parallel top and bottom plates, a first enclosure member side plate perpendicularly attached to said top plate and protruding downward towards said bottom plate, an elongated slot between said bottom plate and said side plate; and
   a second enclosure member cooperative with said first enclosure member, said second enclosure member having a rear plate generally perpendicularly offset from said parallel top and bottom plates and said first enclosure member side plate, said rear plate having an attached perpendicular second enclosure member side plate which is parallel with said first enclosure member side plate and disposed inside of said first enclosure member side plate in said elongated slot and which is movable through said elongated slot.

6. The enclosure as claimed in claim 5, wherein said second enclosure member side plate is movable through said elongated slot in translation.

7. The enclosure as claimed in claim 5, wherein said second enclosure member side plate is movable through said elongated slot in rotation.

8. The enclosure as claimed in claim 5, wherein said second enclosure member side plate is movable through said elongated slot in translation and rotation.

9. An enclosure for electrical apparatus, comprising:
   a first enclosure member including a pair of spaced generally parallel top and bottom plates, a first enclosure member side plate perpendicularly attached to said top plate and protruding downward towards said bottom plate, an elongated slot between said bottom plate and said side plate; and
   a second enclosure member cooperative with said first enclosure member; said second enclosure member having a plate generally perpendicularly offset from said parallel top and bottom plates and said first enclosure member side plate, said second enclosure member plate having an attached perpendicular second enclosure member side plate which is parallel with said first enclosure member side plate and disposed inside of said first enclosure member side plate in said elongated slot and which is movable through said elongated slot.

10. The enclosure as claimed in claim 9, wherein said second enclosure member side plate is movable through said elongated slot in translation.

11. The enclosure as claimed in claim 9, wherein said second enclosure member side plate is movable through said elongated slot in rotation.

12. The enclosure as claimed in claim 9, wherein said second enclosure member side plate is movable through said elongated slot in translation and rotation.

13. An enclosure for electrical apparatus, comprising:
   a first enclosure member including a pair of spaced generally parallel top and bottom plates, said top plate having a pair of top plate side ends, a top plate front end and a top plate back end, said bottom plate having a pair of bottom plate side ends, a bottom plate front end and a bottom plate back end, a pair of first enclosure member spaced apart side plates each of which is perpendicularly attached to one side end of said top plate and protruding downward towards said bottom plate, elongated slots between said bottom plate side ends and the nearest said side plate; and
   a second enclosure member cooperative with said first enclosure member; said second enclosure member having a plate generally perpendicularly offset from said parallel top and bottom plates and said pair of first enclosure member side plates, said second enclosure member plate having plate sides, said second enclosure member plate sides attached perpendicularly to said second enclosure member side plates on either plate side thereof, said second enclosure member side plates disposed inside of said first enclosure member side plates on either side of said bottom plate, each of said second enclosure member side plates being disposed one each in an elongated slot and movable through said elongated slots.

14. The enclosure as claimed in claim 13, wherein said second enclosure member side plates are movable through said elongated slots in translation.

15. The enclosure as claimed in claim 13, wherein said second enclosure member side plates are movable through said elongated slots in rotation.

16. The enclosure as claimed in claim 13, wherein said second enclosure member side plates are movable through said elongated slots in translation and rotation.

17. The enclosure as claimed in claim 13, comprising a first enclosure member front plate perpendicularly attached to said top plate at the front end thereof and protruding downward towards and perpendicularly supporting said bottom plate at said bottom plate front end thereof.

18. The enclosure as claimed in claim 17, wherein a mounting bracket is disposed at the bottom of said second enclosure member plate.

19. The enclosure as claimed in claim 17, wherein a mounting bracket is disposed on the top of said first enclosure member top plate.

20. The enclosure as claimed in claim 19, wherein said mounting bracket is disposed adjacent said top plate rear end on the top of said first enclosure member top plate.

21. The enclosure as claimed in claim 17, wherein a mounting bracket is disposed at the bottom of one of said first enclosure member side plates.

22. The enclosure as claimed in claim 21, wherein a mounting bracket is disposed at the bottom of each of said first enclosure member side plates.

23. The enclosure as claimed in claim 17, comprising a flushmount plate attached to said first enclosure member front plate.

24. The enclosure as claimed in claim 23, wherein said flushmount plate has a central opening therein.

* * * * *